(12) United States Patent
Even-Zohar et al.

(10) Patent No.: US 10,783,200 B2
(45) Date of Patent: Sep. 22, 2020

(54) SYSTEMS AND METHODS OF DE-DUPLICATING SIMILAR NEWS FEED ITEMS

(71) Applicant: SALESFORCE.COM, INC., San Francisco, CA (US)

(72) Inventors: Yair Even-Zohar, Herzliya (IL); Elad Tsur, Zikhron Ya'akov (IL)

(73) Assignee: salesforce.com, inc., San Francisco, CA (US)

( * ) Notice: Subject to any disclaimer, the term of this patent is extended or adjusted under 35 U.S.C. 154(b) by 280 days.

(21) Appl. No.: 15/988,877

(22) Filed: May 24, 2018

(65) Prior Publication Data
US 2018/0268071 A1 Sep. 20, 2018

Related U.S. Application Data

(63) Continuation of application No. 14/512,215, filed on Oct. 10, 2014, now Pat. No. 9,984,166.

(51) Int. Cl.
*G06F 7/00* (2006.01)
*G06F 16/9535* (2019.01)

(52) U.S. Cl.
CPC ................................. *G06F 16/9535* (2019.01)

(58) Field of Classification Search
CPC ............... G06F 16/1748; G06F 16/215; G06F 16/24556; G06F 7/20; G06F 7/14; G06F 17/30648
See application file for complete search history.

(56) References Cited

U.S. PATENT DOCUMENTS

| | | | |
|---|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose |
| 5,761,419 A | 6/1998 | Schwartz |
| 5,819,038 A | 10/1998 | Carleton |

(Continued)

OTHER PUBLICATIONS

U.S. Appl. No. 14/512,222—Office Action dated Jul. 13, 2017, 56 pages. (SALE 1095-2).

(Continued)

*Primary Examiner* — Mohammed R Uddin
(74) *Attorney, Agent, or Firm* — Butzel Long

(57) ABSTRACT

The technology disclosed relates to de-duplicating contextually similar news feed items. In particular, it relates to assembling a set of news feed items from a plurality of electronic sources and preprocessing the set to generate normalized news feed items that share common company-name mentions and token occurrences. The normalized news feed items are used to calculate one or more resemblance measures based on a sequence alignment score and/or a hyperlink score. The sequence alignment score determines contextual similarity between news feed item pairs, arranged as sequences, based on a number of matching elements in the news feed item sequences and a number of edit operations, such as insertion, deletion, and substitution, required to match the news feed item sequences. The hyperlink score determines contextual similarity between news feed item pairs by comparing the respective search results retrieved in response to supplying the news feed item pairs to a search engine.

19 Claims, 9 Drawing Sheets

Resemblance Graph

(56) References Cited

U.S. PATENT DOCUMENTS

| | | |
|---|---|---|
| 5,821,937 A | 10/1998 | Tonelli |
| 5,831,610 A | 11/1998 | Tonelli |
| 5,873,096 A | 2/1999 | Lim |
| 5,918,159 A | 6/1999 | Fomukong |
| 5,963,953 A | 10/1999 | Cram |
| 6,092,065 A * | 7/2000 | Floratos ............ G06K 9/6218 707/737 |
| 6,092,083 A | 7/2000 | Brodersen |
| 6,119,124 A * | 9/2000 | Broder ............... G06F 16/355 |
| 6,161,149 A | 12/2000 | Achacoso |
| 6,169,534 B1 | 1/2001 | Raffel |
| 6,178,425 B1 | 1/2001 | Brodersen |
| 6,189,011 B1 | 2/2001 | Lim |
| 6,216,135 B1 | 4/2001 | Brodersen |
| 6,233,617 B1 | 5/2001 | Rothwein |
| 6,266,669 B1 | 7/2001 | Brodersen |
| 6,295,530 B1 | 9/2001 | Ritchie |
| 6,324,568 B1 | 11/2001 | Diec |
| 6,324,693 B1 | 11/2001 | Brodersen |
| 6,336,137 B1 | 1/2002 | Lee |
| D454,139 S | 3/2002 | Feldcamp |
| 6,367,077 B1 | 4/2002 | Brodersen |
| 6,393,605 B1 | 5/2002 | Loomans |
| 6,405,220 B1 | 6/2002 | Brodersen |
| 6,434,550 B1 | 8/2002 | Warner |
| 6,446,089 B1 | 9/2002 | Brodersen |
| 6,457,028 B1 | 9/2002 | Pitkow |
| 6,535,909 B1 | 3/2003 | Rust |
| 6,549,908 B1 | 4/2003 | Loomans |
| 6,553,563 B2 | 4/2003 | Ambrose |
| 6,560,461 B1 | 5/2003 | Fomukong |
| 6,574,635 B2 | 6/2003 | Stauber |
| 6,577,726 B1 | 6/2003 | Huang |
| 6,601,087 B1 | 7/2003 | Zhu |
| 6,604,117 B2 | 8/2003 | Lim |
| 6,604,128 B2 | 8/2003 | Diec |
| 6,609,150 B2 | 8/2003 | Lee |
| 6,621,834 B1 | 9/2003 | Scherpbier |
| 6,654,032 B1 | 11/2003 | Zhu |
| 6,658,423 B1 | 12/2003 | Pugh |
| 6,665,648 B2 | 12/2003 | Brodersen |
| 6,665,655 B1 | 12/2003 | Warner |
| 6,684,438 B2 | 2/2004 | Brodersen |
| 6,711,565 B1 | 3/2004 | Subramaniam |
| 6,724,399 B1 | 4/2004 | Katchour |
| 6,728,702 B1 | 4/2004 | Subramaniam |
| 6,728,960 B1 | 4/2004 | Loomans |
| 6,732,095 B1 | 5/2004 | Warshavsky |
| 6,732,100 B1 | 5/2004 | Brodersen |
| 6,732,111 B2 | 5/2004 | Brodersen |
| 6,754,681 B2 | 6/2004 | Brodersen |
| 6,763,351 B1 | 7/2004 | Subramaniam |
| 6,763,501 B1 | 7/2004 | Zhu |
| 6,768,904 B2 | 7/2004 | Kim |
| 6,772,229 B1 | 8/2004 | Achacoso |
| 6,782,383 B2 | 8/2004 | Subramaniam |
| 6,804,330 B1 | 10/2004 | Jones |
| 6,826,565 B2 | 11/2004 | Ritchie |
| 6,826,582 B1 | 11/2004 | Chatterjee |
| 6,826,745 B2 | 11/2004 | Coker |
| 6,829,655 B1 | 12/2004 | Huang |
| 6,842,748 B1 | 1/2005 | Warner |
| 6,850,895 B2 | 2/2005 | Brodersen |
| 6,850,949 B2 | 2/2005 | Warner |
| 7,062,502 B1 | 6/2006 | Kesler |
| 7,069,231 B1 | 6/2006 | Cinarkaya |
| 7,069,497 B1 | 6/2006 | Desai |
| 7,181,758 B1 | 2/2007 | Chan |
| 7,289,976 B2 | 10/2007 | Kihneman |
| 7,293,019 B2 | 11/2007 | Dumais |
| 7,340,411 B2 | 3/2008 | Cook |
| 7,356,482 B2 | 4/2008 | Frankland |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Ps0unis |
| 7,620,655 B2 | 11/2009 | Larsson |
| 7,660,819 B1 | 2/2010 | Frieder |
| 7,698,160 B2 | 4/2010 | Beaven |
| 7,707,157 B1 | 4/2010 | Shen |
| 7,734,627 B1 | 6/2010 | Tong |
| 7,779,475 B2 | 8/2010 | Jakobson |
| 7,814,107 B1 | 10/2010 | Thirumalai |
| 7,851,004 B2 | 12/2010 | Hirao |
| 7,865,830 B2 | 1/2011 | Kim |
| 3,015,495 A1 | 9/2011 | Achacoso |
| 8,014,943 B2 | 9/2011 | Jakobson |
| 8,032,297 B2 | 10/2011 | Jakobson |
| 8,073,850 B1 | 12/2011 | Steven |
| 8,082,301 B2 | 12/2011 | Ahlgren |
| 8,095,413 B1 | 1/2012 | Beaven |
| 8,095,594 B2 | 1/2012 | Beaven |
| 8,209,308 B2 | 6/2012 | Rueben |
| 8,209,333 B2 | 6/2012 | Hubbard |
| 8,275,836 B2 | 9/2012 | Douglas |
| 8,290,962 B1 | 10/2012 | Chu |
| 8,316,292 B1 | 11/2012 | Verstak |
| 8,370,390 B1 | 2/2013 | Permakoff |
| 8,457,545 B2 | 6/2013 | Chan |
| 8,458,194 B1 | 6/2013 | Procopio |
| 8,484,111 B2 | 7/2013 | Sturgeon |
| 8,490,025 B2 | 7/2013 | Jakobson |
| 8,504,945 B2 | 8/2013 | Jakobson |
| 8,510,045 B2 | 8/2013 | Rueben |
| 8,510,664 B2 | 8/2013 | Rueben |
| 8,566,301 B2 | 10/2013 | Rueben |
| 8,646,103 B2 | 2/2014 | Jakobson |
| 8,706,739 B1 | 4/2014 | Song |
| 8,756,275 B2 | 6/2014 | Jakobson |
| 8,769,004 B2 | 7/2014 | Jakobson |
| 8,769,017 B2 | 7/2014 | Jakobson |
| 8,793,238 B1 | 7/2014 | Carver |
| 8,805,840 B1 | 8/2014 | Joshi |
| 9,165,061 B2 | 10/2015 | Fertik |
| 9,483,518 B2 | 11/2016 | Schechter |
| 2001/0044791 A1 | 11/2001 | Richter |
| 2002/0028021 A1 | 3/2002 | Foote |
| 2002/0072951 A1 | 6/2002 | Lee |
| 2002/0082892 A1 | 6/2002 | Raffel |
| 2002/0129352 A1 | 9/2002 | Brodersen |
| 2002/0140731 A1 | 10/2002 | Subramaniam |
| 2002/0143997 A1 | 10/2002 | Huang |
| 2002/0162090 A1 | 10/2002 | Parnell |
| 2002/0165742 A1 | 11/2002 | Robins |
| 2003/0004971 A1 | 1/2003 | Gong |
| 2003/0018705 A1 | 1/2003 | Chen |
| 2003/0018830 A1 | 1/2003 | Chen |
| 2003/0066031 A1 | 4/2003 | Laane |
| 2003/0066032 A1 | 4/2003 | Ramachadran |
| 2003/0069936 A1 | 4/2003 | Warner |
| 2003/0070000 A1 | 4/2003 | Coker |
| 2003/0070004 A1 | 4/2003 | Mukundan |
| 2003/0070005 A1 | 4/2003 | Mukundan |
| 2003/0074418 A1 | 4/2003 | Coker |
| 2003/0120675 A1 | 6/2003 | Stauber |
| 2003/0135445 A1 | 7/2003 | Herz |
| 2003/0151633 A1 | 8/2003 | George |
| 2003/0159136 A1 | 8/2003 | Huang |
| 2003/0187921 A1 | 10/2003 | Diec |
| 2003/0189600 A1 | 10/2003 | Gune |
| 2003/0204427 A1 | 10/2003 | Gune |
| 2003/0206192 A1 | 11/2003 | Chen |
| 2003/0225730 A1 | 12/2003 | Warner |
| 2004/0001092 A1 | 1/2004 | Rothwein |
| 2004/0010489 A1 | 1/2004 | Rio |
| 2004/0015981 A1 | 1/2004 | Coker |
| 2004/0027388 A1 | 2/2004 | Berg |
| 2004/0128001 A1 | 7/2004 | Levin |
| 2004/0162827 A1 * | 8/2004 | Nakano ............... G06F 16/334 |
| 2004/0186860 A1 | 9/2004 | Lee |
| 2004/0193510 A1 | 9/2004 | Catahan |
| 2004/0199489 A1 | 10/2004 | Barnes-Leon |
| 2004/0199536 A1 | 10/2004 | Barnes-Leon |
| 2004/0199543 A1 | 10/2004 | Braud |

(56) References Cited

U.S. PATENT DOCUMENTS

| | | |
|---|---|---|
| 2004/0249789 A1 | 12/2004 | Kapoor |
| 2004/0249854 A1 | 12/2004 | Barnes-Leon |
| 2004/0260534 A1 | 12/2004 | Pak |
| 2004/0260659 A1 | 12/2004 | Chan |
| 2004/0268299 A1 | 12/2004 | Lei |
| 2005/0021490 A1 | 1/2005 | Chen |
| 2005/0027717 A1 | 2/2005 | Koudas |
| 2005/0033657 A1 | 2/2005 | Herrington |
| 2005/0050555 A1 | 3/2005 | Exley |
| 2005/0060643 A1* | 3/2005 | Glass .............. G06F 40/169 715/205 |
| 2005/0091098 A1 | 4/2005 | Brodersen |
| 2006/0021019 A1 | 1/2006 | Hinton |
| 2006/0101069 A1 | 5/2006 | Bell |
| 2006/0167942 A1 | 7/2006 | Lucas |
| 2006/0271534 A1 | 11/2006 | Hamaguchi |
| 2007/0143322 A1* | 6/2007 | Kothari ............ G06F 40/194 |
| 2007/0214097 A1 | 9/2007 | Parsons |
| 2008/0243837 A1 | 10/2008 | Davis |
| 2008/0249966 A1 | 10/2008 | Luege Mateos |
| 2008/0249972 A1 | 10/2008 | Dillon |
| 2009/0043797 A1 | 2/2009 | Dorie |
| 2009/0063415 A1 | 3/2009 | Chatfield |
| 2009/0099996 A1 | 4/2009 | Stefik |
| 2009/0100342 A1 | 4/2009 | Jakobson |
| 2009/0164408 A1 | 6/2009 | Grigorik |
| 2009/0164411 A1 | 6/2009 | Dasdan |
| 2009/0177744 A1 | 7/2009 | Marlow |
| 2009/0182712 A1 | 7/2009 | Kamal |
| 2009/0271359 A1 | 10/2009 | Bayliss |
| 2009/0313236 A1 | 12/2009 | Hernacki |
| 2010/0153324 A1 | 6/2010 | Downs |
| 2010/0198864 A1 | 8/2010 | Ravid |
| 2010/0228731 A1 | 9/2010 | Gollapudi |
| 2010/0254615 A1 | 10/2010 | Kantor |
| 2011/0087668 A1 | 4/2011 | Thomas |
| 2011/0191105 A1 | 8/2011 | Spears |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0137367 A1* | 5/2012 | Dupont ................ G06F 21/00 726/25 |
| 2012/0233137 A1 | 9/2012 | Jakobson |
| 2012/0290407 A1 | 11/2012 | Hubbard |
| 2012/0330728 A1 | 12/2012 | Enyeart |
| 2013/0054688 A1 | 2/2013 | Rourke |
| 2013/0091229 A1 | 4/2013 | Dunn |
| 2013/0138577 A1 | 5/2013 | 3isk |
| 2013/0212497 A1 | 8/2013 | Zelenko |
| 2013/0247216 A1 | 9/2013 | Cinarkaya |
| 2014/0082006 A1 | 3/2014 | Knight |
| 2014/0101134 A1 | 4/2014 | Bohrer |
| 2014/0108006 A1 | 4/2014 | Vogel |
| 2014/0280121 A1 | 9/2014 | Sharp |
| 2015/0081690 A1 | 3/2015 | Arom |
| 2015/0347593 A1 | 12/2015 | Tsai |
| 2016/0048764 A1 | 2/2016 | Viola |
| 2016/0330237 A1 | 11/2016 | Edlabadkar |

OTHER PUBLICATIONS

U.S. Appl. No. 14/512,222—"Automatic Clustering by Topic and Prioritizing Online Feed Items", inventors Alon Talmor and T. Brown, filed Oct. 10, 2014, 29 pages (SALE 1095-2).

Broder, Andrei Z., "Identifying and Filtering Near-Duplicate Documents", CPM '00, Proceedings of the 11th Annual Symposium on Combinatorial Pattern Matching, Springer-Verlag London, UK, 2000, pp. 1-10.

U.S. Appl. No. 14/512,215—Office Action dated Oct. 19, 2016, 40 pages (SALE 1095-1).

U.S. Appl. No. 14/512,215—"Systems and Methods of De-duplicating Similar News Feed Items", inventors Yair Even-Zohar and Elad Tsur, filed Oct. 10, 2014, 24 pages (SALE 1095-1).

P. E. Hart and J. Graham, "Query-free information retrieval," in IEEE Expert, vol. 12, No. 5, pp. 32-37, Sep./Oct. 1997. Retreived Apr. 28, 2018 from <http://ieeexplore.ieee.org/stannp/stannp.jsp?tp=&arnunnber=621226&isnunnber=13513> (Year: 1997).

* cited by examiner

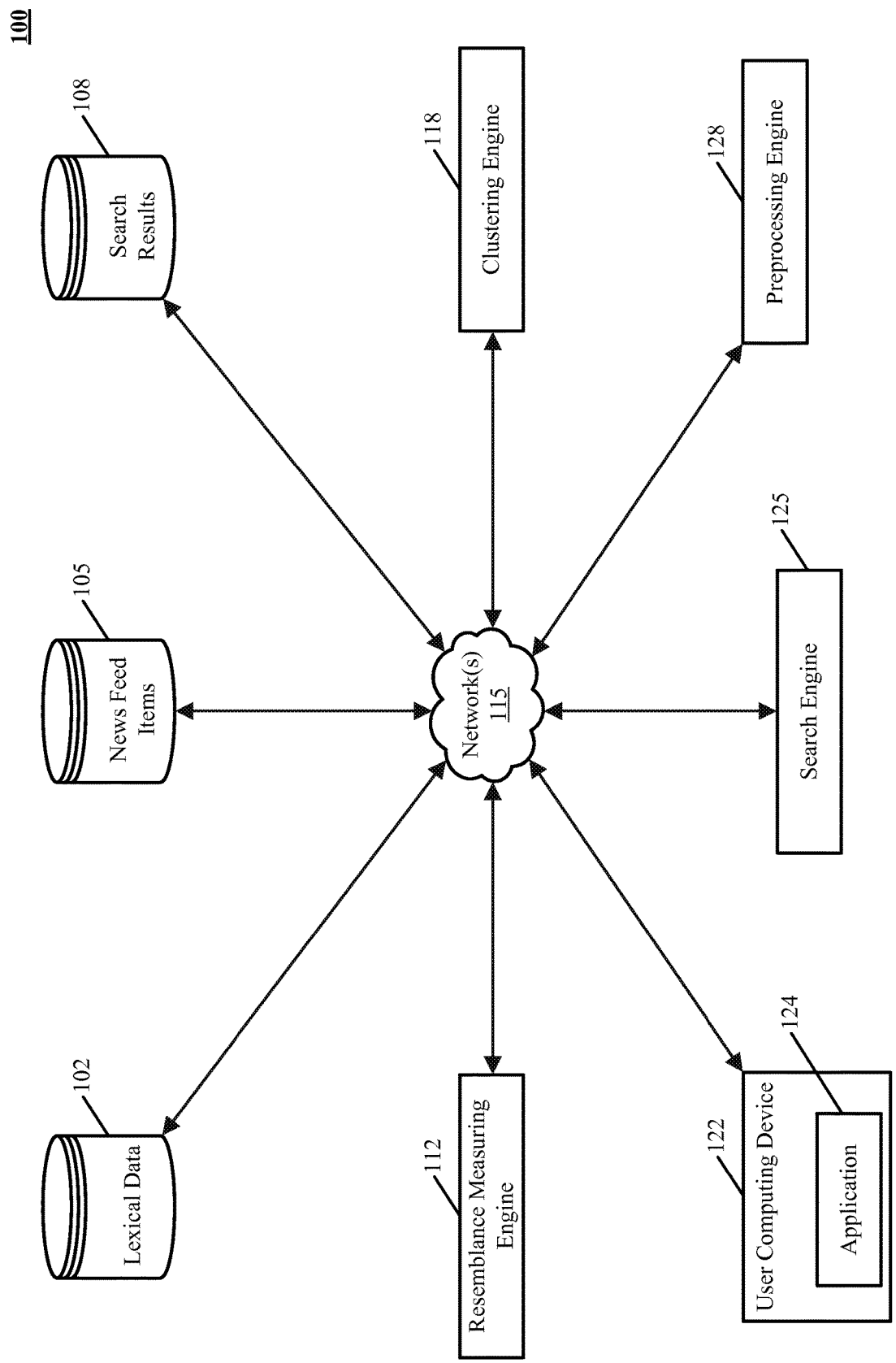
FIG. 1 – Servers, Clients, and Databases

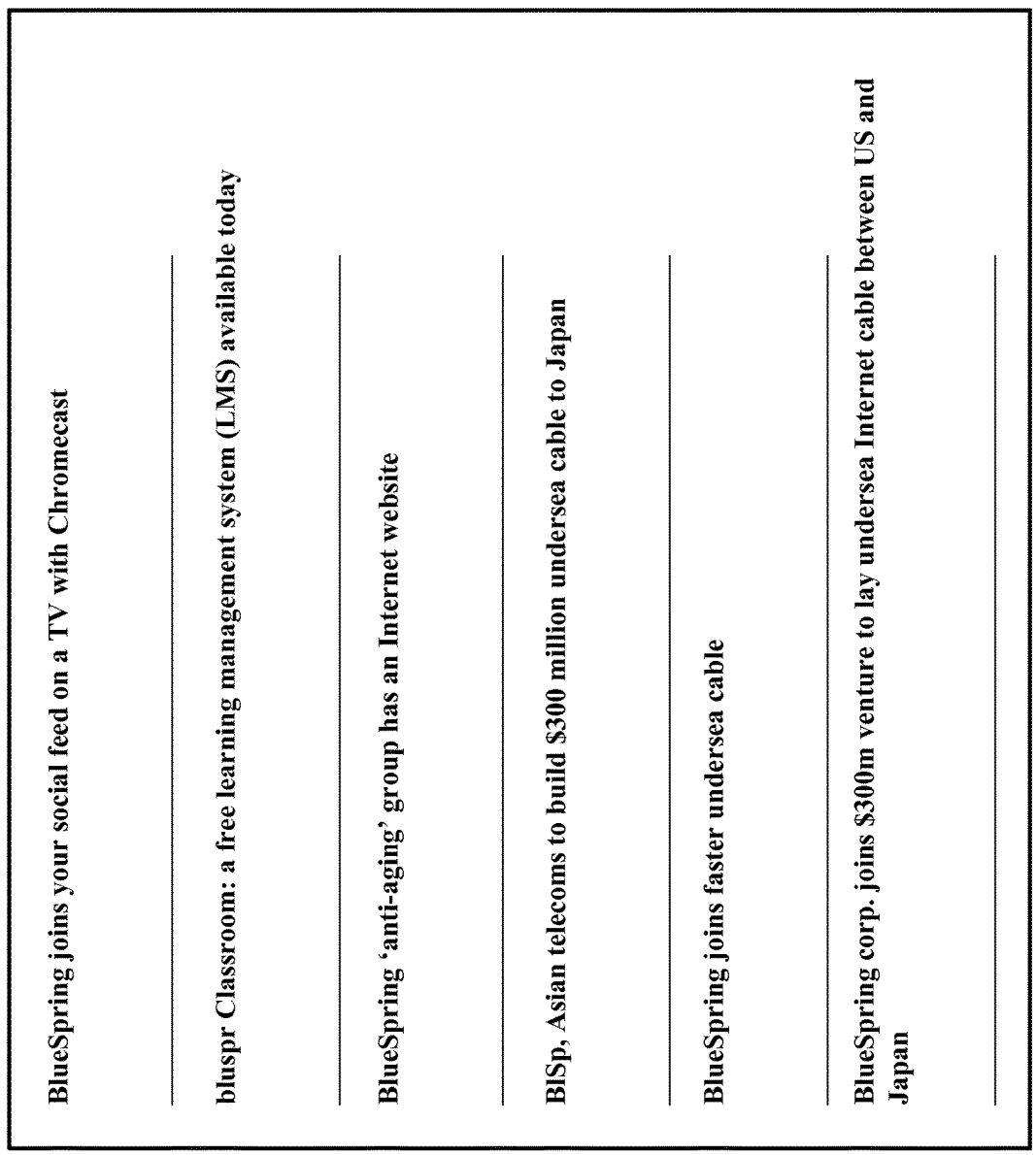
FIG. 2 – News Feed Items

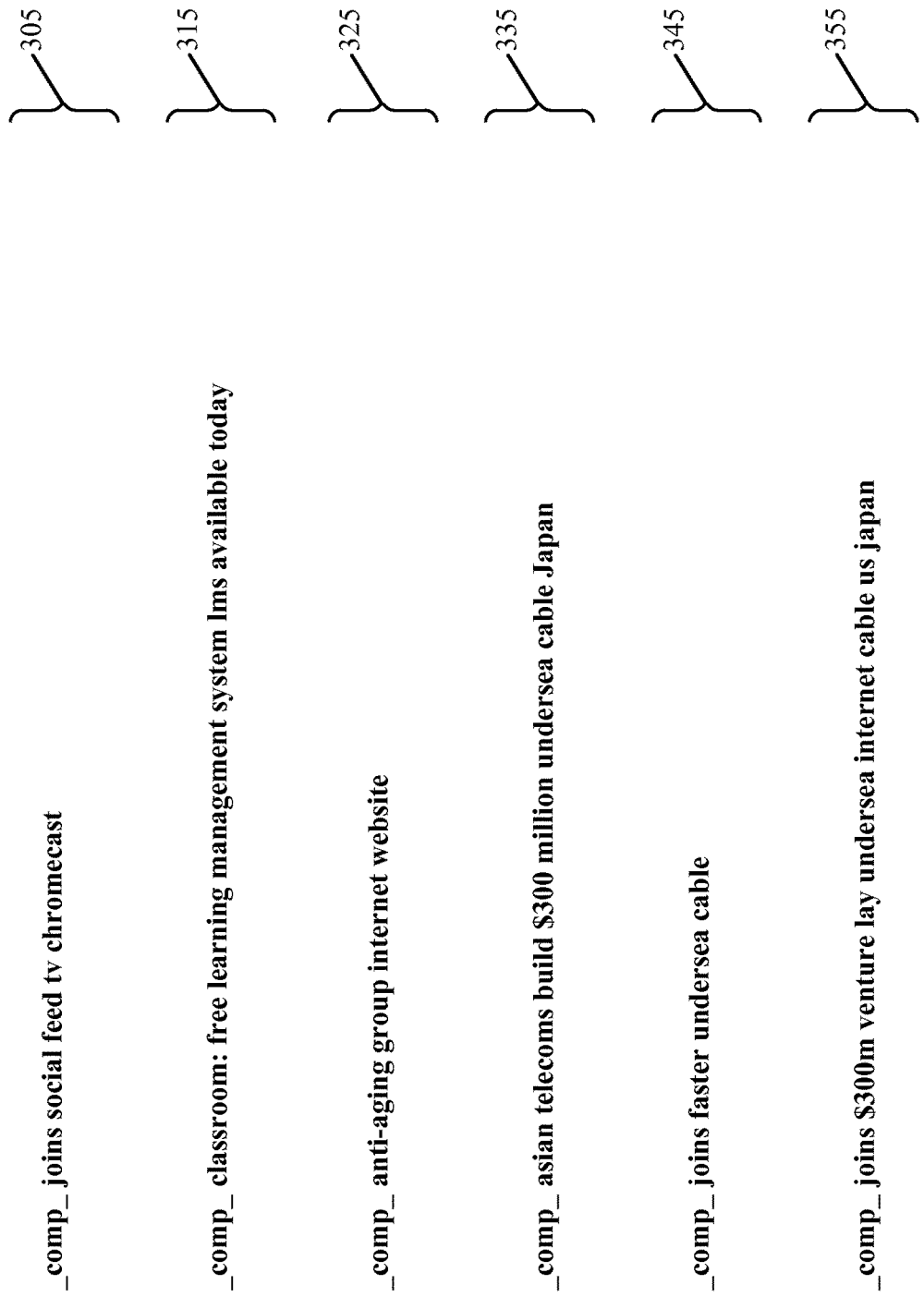
FIG. 3 – Normalized News Feed Items

400

| _comp_ | joins | faster | undersea | cable | | | | } 245

| _comp_ | joins | $300m | venture | lay | undersea | internet | cable | between | us | japan | } 255

- _comp_: +1  ⎫ bigram
- join: +2    ⎭
- faster is substituted by 300m: +1
- venture: 0
- lay: -1
- undersea: 0
- internet: -1
- cable: 0
- between: -1
- us: -2
- japan: -3
- raw score: -3
- boosted score: 0 (bigram = +3)

FIG. 4 – Sequence Alignment Based Resemblance Measuring

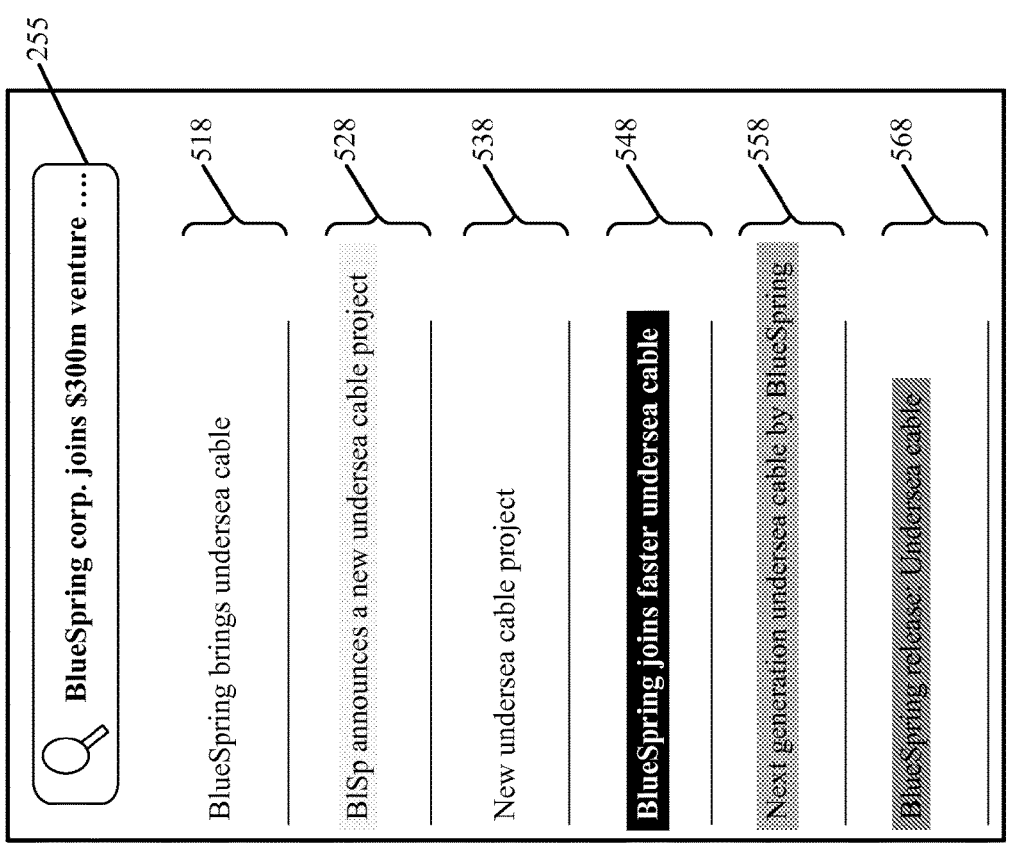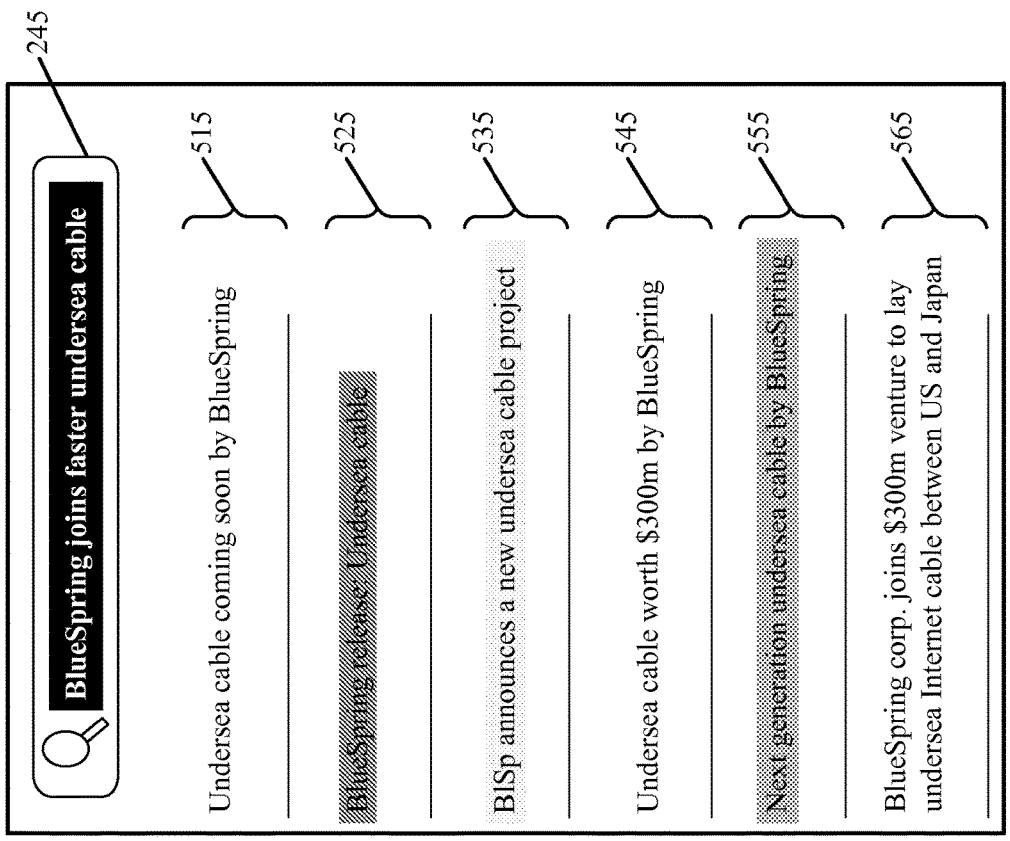
FIG. 5 – Search Criteria Based Resemblance Measuring

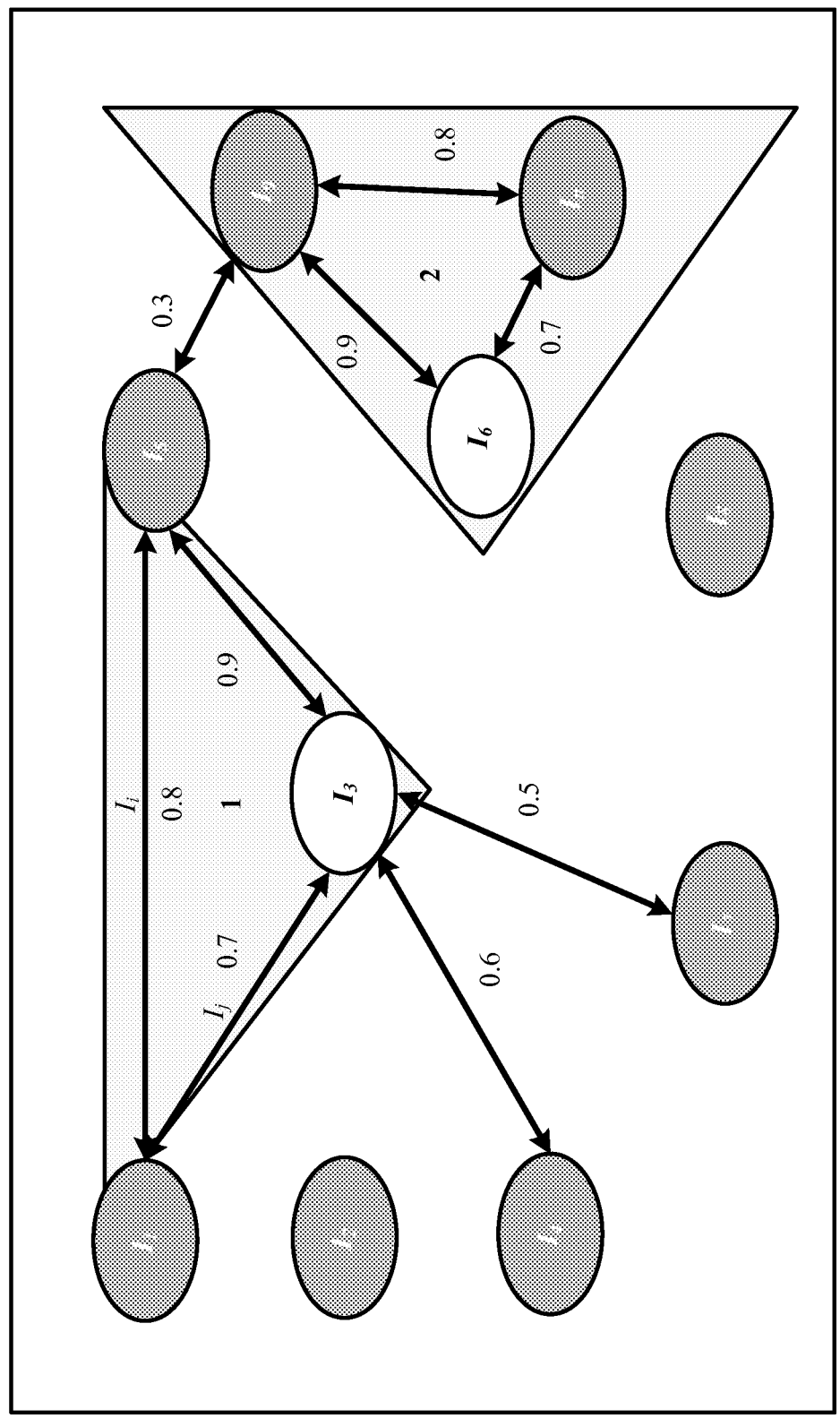
FIG. 6 – Resemblance Graph

700

| Word | PrefixID |
|---|---|
| Dr. | PRX01 |

⋮ Prefix Objects 702

| Word | PostfixID |
|---|---|
| Software | PSX01 |

⋮ Postfix Objects 712

| Word | StopWordID |
|---|---|
| the | STW01 |

⋮ Stop Word Objects 722

| Word | WordID | SynonymID | SynonymID |
|---|---|---|---|
| Acquire | WD01 | WD02 | WD97 |
| Purchase | WD02 | WD01 | WD56 |

⋮ Synonym Objects 732

| Company Name | Alternative Names | Abbreviations |
|---|---|---|
| BlueSpring Corp. | bluSpr | BlSp |

⋮ Company Name Objects 742

FIG. 7 – Data Objects

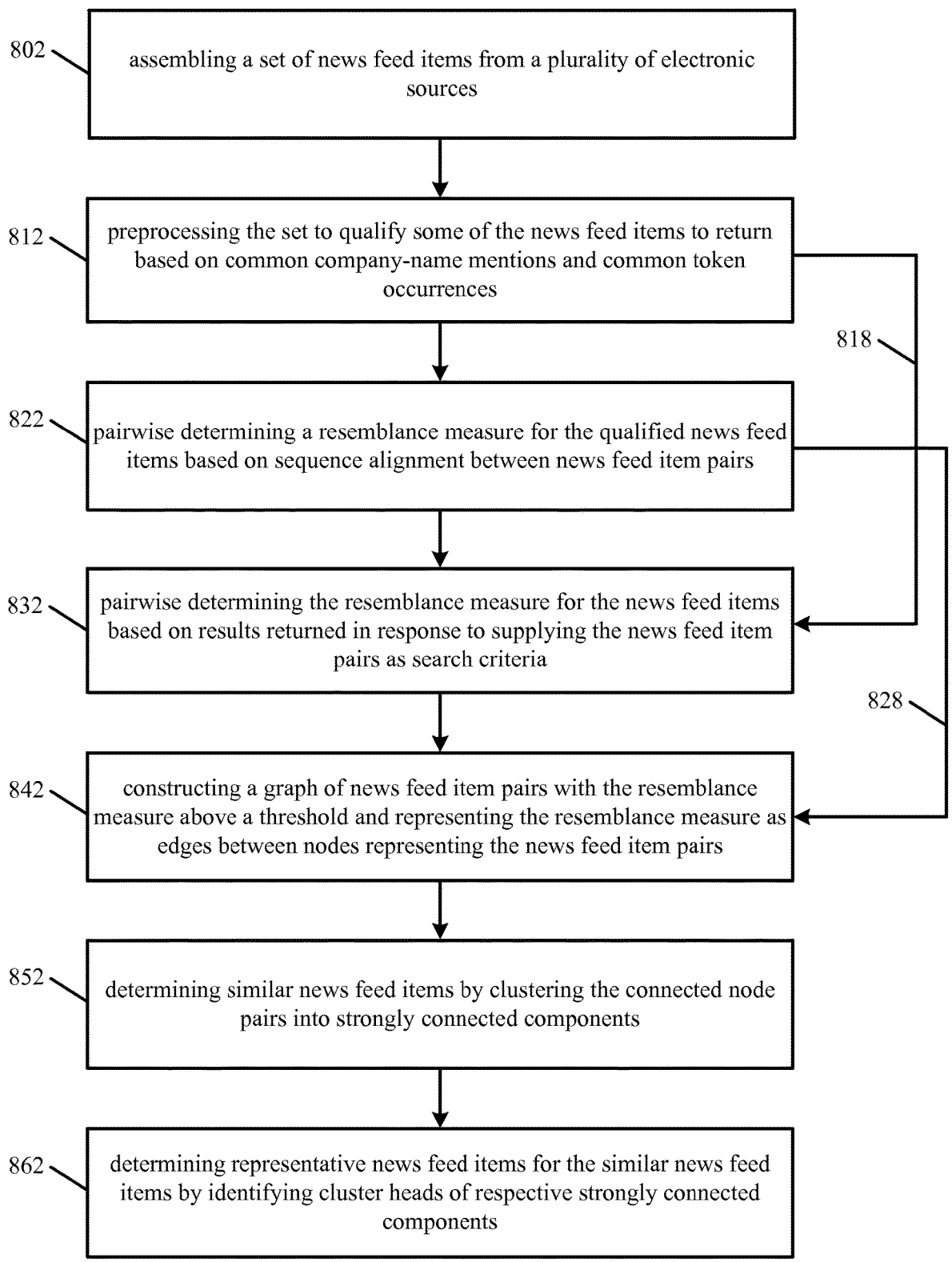
FIG. 8 – De-Duplicating Similar News Feed Items

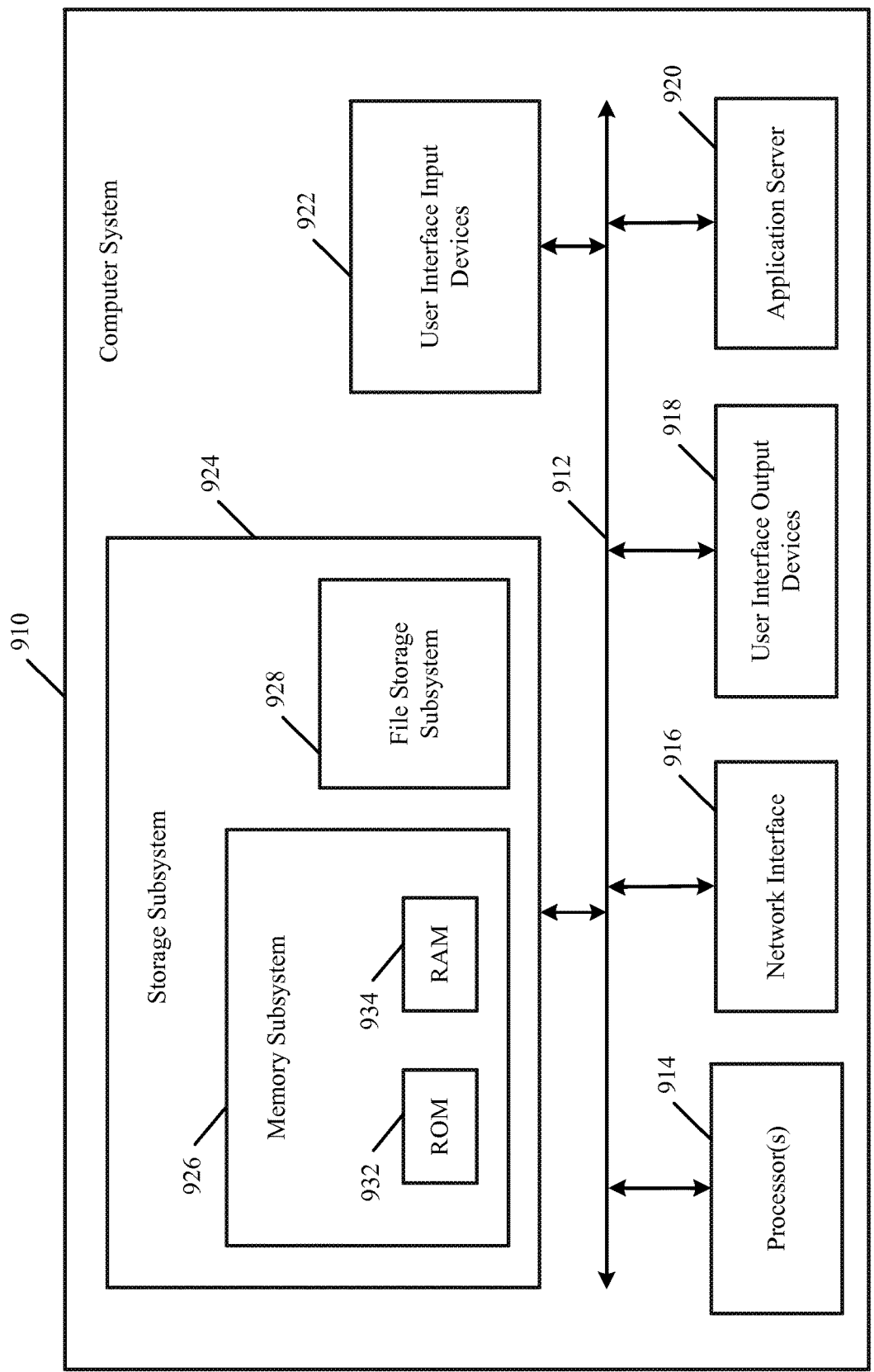
FIG. 9 – Computer System

SYSTEMS AND METHODS OF DE-DUPLICATING SIMILAR NEWS FEED ITEMS

RELATED APPLICATION

This application is related to US Patent Application entitled "Automatic Clustering By Topic And Prioritizing Online Feed Items," filed contemporaneously. The related application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

As the volume of information flowing on the web continues to increase, the need for automated tools that can assist users in receiving information valuable to them also increases. The information overload created by multitude of information sources, such as websites and social media sites, makes it difficult for users to know what piece of information is more suitable, relevant, or appropriate to their needs and desires. Also, a substantial portion of users' web surfing time is spent on separating information from noise.

In particular, service providers are continually challenged to deliver value and convenience to users by, for example, providing efficient search engine with high precision and low recall. One area of interest has been the development of finding and accessing desired content or search results. Currently, users locate content by forging through lengthy and exhausting search results, many of which include similar information. However, such methods can be time consuming and troublesome, especially if users are not exactly sure what they are looking for. Although these issues exist with respect to non-mobile devices, such issues are amplified when it comes to finding desired content or search results using mobile devices that have much limited screen space and can only display few search results per screen.

An opportunity arises to shift the burden of information filtering from users to automated systems and methods that determine contextual similarity between news feed items and present a single news feed item that represents a group of contextually similar news feed items. Improved user experience and engagement and higher user satisfaction and retention may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 shows an example environment of de-duplicating similar news feed items.

FIG. 2 shows a set of news feed items assembled from a plurality of electronic sources.

FIG. 3 is one implementation of a set of normalized news feed items.

FIG. 4 illustrates one implementation of determining a resemblance measure for normalized news feed items based on sequence alignment between news feed item pairs.

FIG. 5 depicts one implementation of determining a resemblance measure for normalized news feed items based on results returned in response to supplying the normalized news feed item pairs as search criteria.

FIG. 6 shows one implementation of constructing a resemblance graph of news feed item pairs with a resemblance measure above a threshold and representing the resemblance measure as edges between nodes representing the news feed item pairs.

FIG. 7 depicts one implementation of a plurality of objects that can be used to de-duplicate similar news feed items.

FIG. 8 is a representative method of de-duplicating similar news feed items.

FIG. 9 is a block diagram of an example computer system used to de-duplicate similar news feed items.

DETAILED DESCRIPTION

Introduction

Online news feed items, also referred to as "insights," often spread through several channels such as websites, RSS feeds and Twitter feed. Often times, the same insight is repeated over multiple news sources and thus creates duplication. Such duplicate insights can show up as identical items, items with little textual difference, or even significant textual difference among the multiple news sources. However, contextually, they carry the same news item.

The technology disclosed can be used to solve the technical problem of de-duplicating contextually similar news feed items such as the following four news feed items, which include similar content and thus should be presented to a user as a single news feed item.

BlueSpring Owns a Satellite Now
    BlueSpring Corp. to acquire satellite company Skybox in $500 M deal
    BlueSpring buys satellite imaging firm for $500 mn
    BlueSpring Invests Billions on Satellites to Expand Internet Access The technology disclosed relates to assembling a set of news feed items from a plurality of electronic sources and preprocessing the set to generate normalized news feed items that share common company-name mentions and common token occurrences. The normalized news feed items are then used to calculate one or more resemblance measures based on a sequence alignment score and/or a hyperlink score. The sequence alignment score determines contextual similarity between news feed item pairs, arranged as sequences, based on a number of matching tokens, and their proximity in the news feed item sequences and a number of edit operations, such as insertion, deletion, and substitution, required to match the news feed item sequences. The hyperlink score determines contextual similarity between news feed item pairs by comparing the respective search results retrieved in response to supplying the news feed item pairs to a search engine.

Further, the technology disclosed determines contextual similarity between large amounts of data representing the news feed items by constructing a resemblance graph of normalized news feed items with the resemblance measure above a threshold. In the resemblance graph, the resemblance measure is represented as edges between nodes representing the news feed item pairs, forming connected node pairs. Following this, contextual similar news feed items are then determined by clustering the connected node pairs into strongly connected components and cliques. After this, representative news feed items for the contextually similar news feed items are derived by identifying cluster heads of respective strongly connected components having highest degree of connectivity in the respective strongly connected components.

Examples of systems, apparatus, and methods according to the disclosed implementations are described in a "news feed items" context. The example of news feed items are being provided solely to add context and aid in the understanding of the disclosed implementations. In other instances, examples of different textual entities like contacts, documents, and social profiles may be used. Other applications are possible, such that the following examples should not be taken as definitive or limiting either in scope, context, or setting. It will thus be apparent to one skilled in the art that implementations may be practiced in or outside the "news feed items" context.

The described subject matter is implemented by a computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied.

As used herein, the "specification" of an item of information does not necessarily require the direct specification of that item of information. Information can be "specified" in a field by simply referring to the actual information through one or more layers of indirection, or by identifying one or more items of different information which are together sufficient to determine the actual item of information. In addition, the term "identify" is used herein to mean the same as "specify."

De-Duplication Environment

FIG. 1 shows an example environment 100 of de-duplicating similar news feed items. FIG. 1 includes a lexical data database 102, news feed items database 105, and search results database 108. FIG. 1 also shows resemblance measuring engine 112, network(s) 115, clustering engine 118, user computing device 122, application 124, search engine 125, and preprocessing engine 128. In other implementations, environment 100 may not have the same elements or components as those listed above and/or may have other/different elements or components instead of, or in addition to, those listed above, such as a source database, social data database, sequence alignment engine, strongly connected components engine, and cluster head engine. The different elements or components can be combined into single software modules and multiple software modules can run on the same hardware.

Network(s) 115 is any network or combination of networks of devices that communicate with one another. For example, network(s) 115 can be any one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, WiFi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

In some implementations, the engines can be of varying types including workstations, servers, computing clusters, blade servers, server farms, or any other data processing systems or computing devices. The engines can be communicably coupled to the databases via different network connections. For example, resemblance measuring engine 112 and clustering engine 118 can be coupled via the network 115 (e.g., the Internet), search engine 125 can be coupled via a direct network link, and preprocessing engine 128 can be coupled by yet a different network connection.

In some implementations, databases can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. In some implementations, user computing device 122 can be a personal computer, laptop computer, tablet computer, smartphone, personal digital assistant (PDA), digital image capture devices, and the like.

Application 124 can take one of a number of forms, including user interfaces, dashboard interfaces, engagement consoles, and other interfaces, such as mobile interfaces, tablet interfaces, summary interfaces, or wearable interfaces. In some implementations, it can be hosted on a web-based or cloud-based privacy management application running on a computing device such as a personal computer, laptop computer, mobile device, and/or any other hand-held computing device. It can also be hosted on a non-social local application running in an on-premise environment. In one implementation, application 124 can be accessed from a browser running on a computing device. The browser can be Chrome, Internet Explorer, Firefox, Safari, and the like. In other implementations, application 124 can run as an engagement console on a computer desktop application.

Lexical data 102 store entries associated with terms in news feed items. In one implementation, it can include a glossary of words and company names such that each entry identifies the multiple mention forms the corresponding word or company name can take. Examples of multiple mention forms include thesaurus (acquire vs. purchase vs. bought), abbreviations (Salesforce.com vs. SFDC), shortened forms (Salesforce vs. Sf), alternative spellings (Salesforce v. Salesforce.com), and stock aliases (Salesforce vs. CRM). When the news feed item pairs are matched, such multiple forms are taken in account to determine contextual resemblance between the news feed item pairs. In another implementation, it identifies common prefixes and postfixes used with company names, such as "LLP" and "Incorporation," that can be used to extract company names from the news feed items.

In some implementations, lexical data 102 serves as a dictionary that identifies various root and affix references and verb and noun forms associated with a word. In yet another implementation, lexical data 102 can include a list of stop words that are the most common words in a language (e.g. and, the, but, etc. for English). These stop words are omitted from matching of the news feed item pairs. Eliminating stop words from matching ensures that resemblance measuring between news feed item pairs is faster, efficient and more accurate.

News feed items 105 include online news articles or insights assembled from different types of data sources. News feed items 105 can be web pages, or extracts of web pages, or programs or files such as documents, images, video files, audio files, text files, or parts of combinations of any of these stored as a system of interlinked hypertext documents that can be accessed via the network(s) 115 (e.g., the Internet) using a web crawler. Regarding different types of data sources, access controlled application programming interfaces (APIs) like Yahoo Boss, Facebook Open Graph, or Twitter Firehose can provide real-time search data aggregated from numerous social media sources such as LinkedIn, Yahoo, Facebook, and Twitter. APIs can initialize sorting, processing and normalization of data. Public internet can provide data from public sources such as first hand websites, blogs, web search aggregators, and social media aggregators. Social networking sites can provide data from social media sources such as Twitter, Facebook, LinkedIn, and Klout.

Preprocessing engine 128 generates a normalized version of the assembled news feed items to determine contextual resemblance between the news feed items. According to one implementation, this is achieved by identifying a name of at least one company to which a particular news feed item relates to and finding other news feed items about the same company. In one implementation, preprocessing engine 128 matches a textual mention in a news feed item to an entry in the lexical data 102, such as a company name, that is a canonical entry for the textual mention. This implementation also includes looking up variants of the company name to identify mentions of any known abbreviations, shortened forms, alternative spellings, or stock aliases of the company name.

According to some implementations, preprocessing engine 128 identifies news feed items with common text mentions, including exact matches of company names and equivalent matches of company names variants. In another implementation, preprocessing engine 128 removes any stop words from the news feed items to facilitate efficient comparison of the news feed items, preferably before identifying common company-name mentions.

According to some implementations, contextual resemblance between news feed items is further determined based on common token occurrences in the news feed items that are identified as belonging to a same company. A "token" refers to any of a variety of possible language units, such as a word, a phrase, a number, a symbol, or the like, that represents a smallest unit of language that conveys meaning. In one implementation, a news feed item can be decomposed into one or more tokens using a tokenizer, which represents a set of language specific rules that define a boundary of a token.

Based on noun and verb variants of the tokens (stored in lexical data 102), preprocessing engine 128 identifies not only exact token occurrences, but also equivalent token occurrences between news feed items belonging to a same company. For example, consider a first news feed item that includes "BlSp announce a new ceo" and a second news feed item that includes "BlSp announces upgrade in its servers."

In this example, processing engine 128, after determining that the first and second news feed item pairs belong to the same company named "BlSp," further identifies that they respectively include distinctive singular and plural forms of the same word "announce" and hence have greater contextual resemblance with each other relative to other news feed items about the same company that lack such a common word.

Search engine 125 provides a search service for searching news feed items accessible online. In one implementation, search engine 125 includes a query server to receive a search query, find news feed items relevant to the search query, and return search results 108 indicating at least some of the found news feed items ranked according to mentions of the respective found news feed items. In some implementations, search engine 125 can include a crawler that downloads and indexes content from the web, including from one or more social networking sites.

Search results 108 stores search results returned by the search engine 125 in response to providing the news feed items as search criteria to the search engine 125. In one implementation, the search results 108 include metadata associated with the web pages, including unified resource locators (URLs), title, concise description, content, publication data, and authorship data.

Resemblance measuring engine 112 determines a degree of contextual resemblance between news feed item pairs. In one implementation, this is achieved by applying a sequence alignment algorithm to normalized news feed item pairs arranged as sequences and calculating a resemblance measure for the news feed item pairs based on number, length and proximity of exact matches between news feed item sequences and a number of edit operations required to match the respective sequences with each other. In another implementation, resemblance measuring engine 112 supplies normalized news feed item pairs to the search engine 125 as search criteria and based on the retrieved results of the respective news feed items, including web pages and their metadata, determines a resemblance measure for the news feed item pairs.

In some implementations, resemblance measuring engine 112 can measure the closeness between news feed items pairs by employing a plurality of resemblance functions, including "edit distance," also known as Levenshtein distance. Given two news feed items n1 and n2, the edit distance (denoted ed (n1, n2)) between the news feed items can be given by the number of "edit" operations required to transform n1 to n2 (or vice versa). The edit distance is then defined by a set of edit operations that are allowed for the transformation, including insert, delete, and replace of one character at any position in the news feed items. Further, each edit operation results in incurring of a positive or negative cost, and the cost of sequence of operations is given by the sum of costs of each operation in the sequence. Then, the edit distance between two news feed items is given by the cost of the cost-minimizing sequence of edit operations that translates one news feed item to another.

In other implementations, resemblance measuring engine 112 uses "jaccard set resemblance" to identify contextually similar news feed items. The jaccard resemblance is the ratio of the size of the intersection over the size of the union. Hence, news feed item pairs that have a lot of elements in common are closer to each other. To apply the jaccard set resemblance between two news feed items, the two input news feed items n1 and n2 are transformed into sets. This is achieved by obtaining the set of all n-grams of the input news feed items. An n-gram is a continuous sequence of n characters in the input. Given the two input news feed items feed n1 and n2, n-grams of each news feed item are obtained to derive sets Q (n1) and Q (n2). The resemblance between n1 and n2 is given by the jaccard resemblance J (Q (n1), Q (n2)) between the two sets of n-grams. In some implementations, the sizes of the various sets can be replaced with weighted sets.

In yet other implementations, the resemblance measuring engine 112 employs a "cosine resemblance" function that uses a vector-based resemblance measure between news feed items where the input news feed items n1 and n2 are translated to vectors in a high-dimensional space. In one implementation, the transformation of the input news feed items to vectors is done based on the tokens that appear in the news feed item, with each token corresponding to a dimension and the frequency of the token in the input being the weight of the vector in that dimension. The contextual resemblance is then given by the cosine resemblance of the two vectors i.e., the cosine of the angle between the two vectors.

Given a collection of similar news feed item pairs to be de-duplicated, clustering engine 118 applies a resemblance function to all pairs of news feed items to obtain a weighted resemblance graph where the nodes are the news feed items in the collection and there is a weighted edge connecting each pair of nodes, the weight representing the amount of resemblance. The resemblance function returns a resemblance measure which can be a value between 0 and 1, according to one implementation. A higher value indicates a greater resemblance with 1 denoting equality. In some implementations, clustering engine 118 decomposes or partitions the resemblance graph into its strongly connected components where nodes that are connected with large edge weights have a greater likelihood being in the same group of contextually similar insights. In one implementation, only those edges whose weight is above a given threshold are used for determining the strongly connected components. As a result, when the set of news feed items is very large, clustering performs a blocking to bring similar "components" of news feed items together, and a finger-grained pairwise comparison is only performed within each component.

News Feed Items

FIG. 2 shows a set 200 of news feed items assembled from a plurality of electronic sources. In FIG. 2, six news feed items 205-255 are collected from different sources described above and include at least one of webpages, RSS feeds, social media feeds such as twitter feeds, and documents. In some implementations, news feed items 205-255 are published with a time window prior to a current time such that other news feed items outside the time window are not included in the set 200, irrespective of their contextual similarity. In one implementation, news feed items 205-255 are grouped together because they relate to a same company and are used to evaluate a newly received news feed item that shares the same company name reference as the news feed item group 205-255. FIG. 3 is one implementation of a set 300 of normalized news feed items 305-355 resulting from the elimination of stop words from the news feed items 205-255 and substitution of common company references ("BlueSpring," "bluspr," "BlSp," "CRM," "BlueSpring corp.") with a constant token "_comp_."

Sequence Alignment

FIG. 4 illustrates one implementation of determining a resemblance measure for normalized news feed items based on sequence alignment 400 between news feed item pairs. In FIG. 4, two news feed items 415 and 425 are compared as sequences to calculate raw scores and boosted scores of the sequence alignment. In one implementation, a term penalty matrix is used, giving lower penalty for replacing contextually-similar tokens, such as "acquire," "purchase," and "buy." In another implementation, the term penalty matrix assigns a negative penalty for each edit operation such as insertion, deletion, and substitution. In yet another implementation, n-grams such as bigrams (two contiguous matching tokens) and trigrams (three contiguous matching tokens) are rewarded by augmenting the raw score to produce a boosted score. In other implementations, the resemblance measure is responsive to other factors such as original distance, normalized distance, maximum string length, minimum string length, and longest consecutive matches.

The sequence alignment algorithm can be applied based on predetermined rules. For instance, each insertion, deletion, and substitution results in a count one being deducted from the resemblance measure, each exact match causes a one incremental in the resemblance measure, a bigram is an addition of three positive counts to the raw score, and trigram is an addition of seven positive counts to the raw score.

As shown in FIG. 4, the first two tokens of the news feed item pairs 415 and 425 match exactly, causing the initially zero resemblance measure to become positive two. At the third token position, the word "faster" in sequence 415 is substituted by the text "$300 m," resulting in the resemblance measure depreciating to one from two. Further, the next two mismatches of words "venture" and "lay" in sequence 425 produce the resemblance measure of minus one. Advancing to the sixth token position in sequence 425, the word "undersea" exists in both the sequences 415 and 425, resulting in a plus incremental in the resemblance measure. After evaluating the entire sequences 415 and 425, the raw score is calculated to be minus three and the presence of a bigram adds three positive counts to the raw score and results in a boosted score of zero.

FIG. 5 depicts one implementation of determining a resemblance measure for normalized news feed items based on results returned 500 in response to supplying the normalized news feed item pairs as search criteria 505 and 508. In the example shown in FIG. 5, news feed item pairs 245 and 255 are supplied as search criteria to search engine 125. The returned results 515, 525, 535, 545, 555, and 565 for the news feed item 245 are then compared with the returned results 518, 528, 538, 548, 558, and 568 for the news feed item 255. For each match, such as feed item 525 and feed item 568, feed item 535 and feed item 528, feed item 555 and feed item 558, a positive count is allocated to the resemblance measure. In some implementations, the resemblance measure is boosted when the news feed item pairs appear in either's returned results, such as news feed item 505 appearing in the returned results of news feed item 508 as news feed item 548. In other implementations, different features of the returned results, such as URLs, content, description, and metadata are compared to determine the resemblance measure.

Clustering

FIG. 6 shows one implementation of constructing a resemblance graph 600 of news feed item pairs with a resemblance measure above a threshold and representing the resemblance measure as edges between nodes representing the news feed item pairs. The set of items $S=\{I_1, \ldots, I_n\}$ form the nodes of the resemblance graph G, and there is a weighted edge between nodes $I_i$ and $I_j$ with weight given by the pairwise resemblance rsm $(I_i, I_j)$. In one implementation, news feed items whose weight is above some threshold t are retained. The threshold t can be designated by a human and/or calculated by a machine based on training examples. For a given implementation, a higher t results in higher precision at the cost of lower recall, while a lower t increases recall at the cost of lower precision.

The resultant graph can be denoted by G (V, E), where V corresponds to items in I, and E is the set of unweighted edges such that $(I_i, I_j) \in E$ if and only if rsm $(I_i, I_j) \geq t$. The set S is then clustered using standard graph clustering techniques such as strongly connected components and cliques. In one implementation, the strongly connected components compute all connected components of G, with each connected component forming a disjoint cluster. In other implementations, cliques calculate all maximum cliques of G, and each maximum clique forms a cluster, which can be non-disjoint clusters in the case of maximal cliques of graph G. In yet other implementations, a representative node or cluster head with a highest degree of connectivity or betweeness in a particular cluster can be identified based on the number edges attached to the node. In scenarios where the degree of connectivity of more than one node in a cluster is same, a cluster head can be identified based on the collective edge weights of respective nodes. As illustrated in FIG. 6, nodes $I_i$, $I_3$, and $I_5$ have high edge weights (0.7, 0.8, 0.9) and hence are identified as a cohort in cluster 1. Further, $I_3$ is determined to be the cluster head of cluster 1 because it has the most number of edges attached to it. Similar, $I_6$, $I_9$, and $I_n$ form cluster 2 with $I_6$ as its cluster head.

FIG. 7 depicts one implementation of a plurality of objects 700 that can be used to de-duplicate similar news feed items. As described above, this and other data structure descriptions that are expressed in terms of objects can also be implemented as tables that store multiple records or object types. Reference to objects is for convenience of explanation and not as a limitation on the data structure implementation. FIG. 7 shows prefix objects 702, postfix objects 712, stop words objects 722, synonym objects 732, and company name objects 742. In other implementations, objects 700 may not have the same objects, tables, entries or fields as those listed above and/or may have other/different objects, tables, entries or fields instead of, or in addition to, those listed above.

Prefix objects 702 uniquely identify common prefixes (e.g. Dr., Mr., Sir) associated with company names using "PrefixID." In contrast, postfix objects 712 store a list of common postfixes associated with company names using "PostfixID." Examples of such postfixes include "LLP," "Company," "LLC," and "Incorporated." Stop word objects 722 specify the various commonly occurring words that can be eliminated from matching of the news feed item pairs. Each such word can be given a unique ID such as "STW01."

Synonym objects 712 list the plurality of synonyms associated with a word. In the example shown in FIG. 7, the word "acquire" is assigned a unique ID "WDO1" and is linked to word "purchase" with a unique ID "WD02" as its synonym. Similarly, company name object 742 can identify the different name forms associated with a particular company. For instance, a company named "BlueSprin" can have an alternative name of "bluSpr" and an abbreviation of "BlsP," and a stock ticker of "CRM." Such variant name forms can be assigned unique name IDs that can be linked to the unique name ID of the most commonly used name or legal name of the company.

In other implementations, objects 700 can have one or more of the following variables with certain attributes: FEED_ID being CHAR (15 BYTE), SOURCE_ID being CHAR (15 BYTE), PUBLICATION_DATE_DATE being CHAR (15 BYTE), PUBLICATION_TIME_TIME being CHAR (15 BYTE), URL_LINK being CHAR (15 BYTE), CREATED_BY being CHAR (15 BYTE), CREATED_DATE being DATE, and DELETED being CHAR (1BYTE).

Flowchart of De-Duplicating Similar News Feed Items

FIG. 8 is a representative method 800 of de-duplicating similar news feed items. Flowchart 800 can be implemented at least partially with a database system, e.g., by one or more processors configured to receive or retrieve information, process the information, store results, and transmit the results. Other implementations may perform the actions in different orders and/or with different, varying, alternative, modified, fewer or additional actions than those illustrated in FIG. 8. Multiple actions can be combined in some implementations. For convenience, this flowchart is described with reference to the system that carries out a method. The system is not necessarily part of the method.

At action 802, a set of news feed items is assembled from a plurality of electronic sources. The electronic sources include access controlled APIs, public Internet, and social networking sites. In one implementation, the news feed items are published within a predetermined time window prior to a current time.

At action 812, the set is preprocessed to qualify some of the news feed items to return based on common company-name mentions and common token occurrences. In one implementation, preprocessing the set further includes removing stop word tokens from the news feed items. The pseudo code below illustrates one example of preprocessing the news feed items to extract company names and replace common company name references with a constant token "_COMP_."

```
//Pre-Comparison
for (Insight X: new set of previously unseen insights){
    X = normalize(X)
    String companies[ ] = extract_Company_Names(X)
    for (String company: companies){
        X' = String.replace(company, "_COMP_");
        company' = normalize_Company_Name(company)
        Set company_Insights_Set =
        company_Insights_Map.get(company')
        company_Insights_Set.add(X')
    }
}
```

At action 822, a resemblance measure is pairwise determined for the qualified news feed items based on sequence alignment between news feed item pairs. In some implementations, the resemblance measure is determined by a plurality of resemblance measures, including edit distance, jaccard set resemblance, and cosine resemblance.

At action 832, a resemblance measure is pairwise determined for the qualified news feed items based on results returned in response to supplying the news feed item pairs as search criteria. In one implementation, the results returned include at least one of unified resource locators (URLs) of web pages, content of the web pages, and metadata about the web pages. In some implementations, the results returned in response to supplying a first news feed item as a search criteria include a second news feed item, further including augmenting the resemblance measure for the first and second news feed time pairs.

The pseudo code below shows one example of determining the resemblance measure by first sequentially aligning the news feed items to calculate a sequential alignment (SA) score and then comparing their search results to derive a hyperlink score.

```
// Comparison
for (Insight X: set of previously unseen insights and normalized){
    Insight insights_compare[ ] = Insights with same company
        name && at least
        one_common_term
    for (Insight Y: insights_compare){
        //Sequential Alignment Comparison
        int seq_alg = SequentialAlignment( X, Y)
        double sa_score = normalize( seq_al )∈ [0,1]
            if (sa_score > Threshold_1){
                mark X and Y as similar with weight=sa_score
                    continue
            }
            //Search Results Comparison
            links_X = links from Search Engine given insight as query
        links_Y = get the comp_Ins from the DB.
        if (links_Y is empty)
                    links_Y = links from Search Engine given
                        comp_Ins as
            query
        double hyper_score = compare (links_X, links_Y)
            f (hyper_score > Threshold_2){
                mark X and Y as similar with weight=hyper_score
            }
    }
}
```

At action 842, a graph of news feed item pairs with the resemblance measure above a threshold is constructed and the resemblance measure is represented as edges between nodes representing the news feed item pairs, thereby forming connected node pairs. The threshold can be designated by a human and/or calculated by a machine based on training examples. A higher threshold results in higher precision at the cost of lower recall, while a lower threshold increases recall at the cost of lower precision.

At action 852, similar news feed items are determined by clustering the connected node pairs into strongly connected components. In some implementations, the clusters can be created using standard graph clustering techniques such as strongly connected components and cliques.

At action 862, representative news feed items are determined for the similar news feed items by identifying cluster heads of respective strongly connected components, which have highest degree of connectivity in the respective strongly connected components.

At action 818, determination of resemblance measure based on sequence alignment at action of 822 is skipped and the qualified news feed items are used to determine a sole resemblance measure based on results returned in response to supplying the news feed item pairs as search criteria.

In contrast, at action 828, determination of resemblance measure based on results returned in response to supplying the news feed item pairs as search criteria at action of 832 is skipped and the qualified news feed items are used to determine a sole resemblance measure based on sequence alignment between news feed item pairs.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application such as customization environment, visually rich customization protocol, text-based customization protocol, branding editor, case submitter, search view, etc.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Computer System

FIG. 9 is a block diagram of an example computer system 900 used to de-duplicate similar news feed items. Computer system 910 typically includes at least one processor 914 that communicates with a number of peripheral devices via bus subsystem 912. These peripheral devices can include a storage subsystem 924 including, for example, memory devices and a file storage subsystem, user interface input devices 922, user interface output devices 918, and a network interface subsystem 916. The input and output devices allow user interaction with computer system 910. Network interface subsystem 916 provides an interface to outside networks, including an interface to corresponding interface devices in other computer systems.

User interface input devices 922 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 910.

User interface output devices 918 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules and methods described herein. These software modules are generally executed by processor 914 alone or in combination with other processors.

Memory 926 used in the storage subsystem can include a number of memories including a main random access memory (RAM) 934 for storage of instructions and data during program execution and a read only memory (ROM) 932 in which fixed instructions are stored. A file storage subsystem 928 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 928 in the storage subsystem 924, or in other machines accessible by the processor.

Bus subsystem 912 provides a mechanism for letting the various components and subsystems of computer system 910 communicate with each other as intended. Although bus subsystem 912 is shown schematically as a single bus, alternative implementations of the bus subsystem can use multiple busses. Application server 920 can be a framework that allows the applications of computer system 900 to run, such as the hardware and/or software, e.g., the operating system.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as one example. Many other configurations of computer system 910 are possible having more or fewer components than the computer system depicted in FIG. 9.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A system for producing a representative item of information from redundant items of information, the system comprising:
    a memory configured to store results of a search; and
    a first processor configured to:
        receive the results in response to providing a pair of items of information as search criteria;
        determine a first resemblance measure of the results by:
            incrementing, by a first count, a counter in response to an existence of a match of a bigram in a first result of the results with a bigram in a second result of the results; and
            decrementing, by a second count, the counter in response to an existence of a situation in which an edit operation is necessary to produce a match of a third result of the results with a fourth result of the results, the edit operation including at least one of an insertion, a deletion, or a substitution;
        produce the representative item of information in response to the first resemblance measure being greater than a first threshold; and
        transmit the representative item, wherein a transmission of the representative item consumes less bandwidth than a transmission of the redundant items of information;
    wherein the redundant items of information are selected from a group consisting of news feed items, contacts, documents, and social profiles.

2. The system of claim 1, wherein the system further comprises a second processor configured to normalize at least one item of information of the redundant items of information.

3. The system of claim 2, wherein the second processor is configured to normalize the at least one item of information by:
    eliminating, from the at least one item of information, a stop word; or
    replacing, in the at least one item of information, common references to a same idea with a specific token.

4. The system of claim 2, wherein the second processor is configured to normalize the at least one item of information prior to the providing the pair of the items of information as the search criteria.

5. The system of claim 2, wherein the second processor is the first processor.

6. The system of claim 1, wherein the first count is greater than the second count.

7. The system of claim 1, wherein the first processor is further configured to determine the first resemblance measure of the results by incrementing, by a third count, the counter in response to an existence of a match of a trigram in the first result of the results with a trigram in the second result of the results, the third count being greater than the first count.

8. The system of claim 1, wherein the first processor is further configured to determine the first resemblance measure of the results by:
    representing a fifth result of the results as a first set of n-grams, an n-gram of the n-grams being a sequence of n characters;
    representing a sixth result of the results as a second set of n-grams;
    determining a union of the first set and the second set;
    determining an intersection of the first set and the second set;
    determining a quotient of the intersection divided by the union; and
    incrementing, by a third count, the counter in response to the quotient being greater than a second threshold.

9. The system of claim 1, wherein the first processor is further configured to determine the first resemblance measure of the results by:
    representing a fifth result of the results as a first vector;
    representing a sixth result of the results as a second vector;
    determining a cosine between the first vector and the second vector; and
    incrementing, by a third count, the counter in response to the cosine being greater than a second threshold.

10. The system of claim 9, wherein the fifth result comprises a number of tokens, the first vector is characterized by a number of dimensions, the number of dimensions is equal to a number of non-duplicated tokens, the number of non-duplicated tokens is less than or equal to the number of tokens, a dimension of the number of dimensions corresponds to a token of the number of non-duplicated tokens, and a value assigned to the dimension is equal to a number of the number of tokens that correspond to the dimension.

11. The system of claim 1, further comprising a second processor configured to apply a resemblance function to pairs of results of the results to produce a graph of the results.

12. The system of claim 1, wherein the resemblance function produces a second resemblance measure.

13. The system of claim 12, wherein the second resemblance measure has a value between zero and one.

14. The system of claim 1, wherein the first processor is further configured to determine the first resemblance measure of the results by incrementing, by a third count, the counter in response to an existence of a match of a first item, of the pair of items of information, with a fifth result of the results, the fifth result received in response to providing a second item, of the pair of items of information, as the search criteria.

15. The system of claim 1, wherein the first processor is further configured to determine the first resemblance measure of the results by incrementing, by a third count, the counter in response to an existence of a match of a fifth result with a sixth result, the fifth result received in response to providing a first item, of the pair of items of information, as the search criteria, the sixth result received in response to providing a second item, of the pair of items of information, as the search criteria.

16. A method for producing a representative item of information from redundant items of information, the method comprising:
   receiving results of a search in response to providing a pair of items of information as search criteria;
   determining a resemblance measure of the results by:
      incrementing, by a first count, a counter in response to an existence of a match of a bigram in a first result of the results with a bigram in a second result of the results; and
      decrementing, by a second count, the counter in response to an existence of a situation in which an edit operation is necessary to produce a match of a third result of the results with a fourth result of the results, the edit operation including at least one of an insertion, a deletion, or a substitution;
   producing the representative item of information in response to the resemblance measure being greater than a threshold; and
   transmitting the representative item, wherein a transmission of the representative item consumes less bandwidth than a transmission of the redundant items of information,
   wherein the redundant items of information are selected from a group consisting of news feed items, contacts, documents, and social profiles.

17. The method of claim 16, wherein the determining the resemblance measure of the results further comprises:
   representing a fifth result of the results as a first set of n-grams, an n-gram of the n-grams being a sequence of n characters;
   representing a sixth result of the results as a second set of n-grams;
   determining a union of the first set and the second set;
   determining an intersection of the first set and the second set;
   determining a quotient of the intersection divided by the union; and
   incrementing, by a third count, the counter in response to the quotient being greater than a second threshold.

18. The method of claim 16, wherein the determining the resemblance measure of the results further comprises:
   representing a fifth result of the results as a first vector;
   representing a sixth result of the results as a second vector;
   determining a cosine between the first vector and the second vector; and
   incrementing, by a third count, the counter in response to the cosine being greater than a second threshold.

19. A non-transitory computer-readable medium storing computer code for controlling a processor to produce a representative item of information from redundant items of information, the computer code including instructions to:
   receive results of a search in response to providing a pair of items of information as search criteria;
   determine a resemblance measure of the results by:
      incrementing, by a first count, a counter in response to an existence of a match of a bigram in a first result of the results with a bigram in a second result of the results; and
      decrementing, by a second count, the counter in response to an existence of a situation in which an edit operation is necessary to produce a match of a third result of the results with a fourth result of the results, the edit operation including at least one of an insertion, a deletion, or a substitution;
   produce the representative item of information in response to the resemblance measure being greater than a threshold; and
   transmit the representative item, wherein a transmission of the representative item consumes less bandwidth than a transmission of the redundant items of information,
   wherein the redundant items of information are selected from a group consisting of news feed items, contacts, documents, and social profiles.

* * * * *